United States Patent [19]
Vogel

[11] 4,263,595
[45] Apr. 21, 1981

[54] APPARATUS FOR IDENTIFYING OBJECTS AND PERSONS

[75] Inventor: Klaus Vogel, Gelting, Fed. Rep. of Germany

[73] Assignee: Siemens Aktiengesellschaft, Berlin & Munich, Fed. Rep. of Germany

[21] Appl. No.: 39,121

[22] Filed: May 15, 1979

[30] Foreign Application Priority Data

May 16, 1978 [DE] Fed. Rep. of Germany ....... 2821299

[51] Int. Cl.³ .......................................... G01S 13/80
[52] U.S. Cl. .............................. 343/6.5 SS; 343/6.8 R
[58] Field of Search ........................ 343/6.5 SS, 6.8 R

[56] References Cited

U.S. PATENT DOCUMENTS

| | | | |
|---|---|---|---|
| 3,362,025 | 1/1968 | Mori | 343/6.5 SS |
| 3,377,616 | 4/1968 | Auer, Jr. | 343/6.5 SS X |
| 3,706,094 | 12/1972 | Cole et al. | 343/6.5 SS |
| 3,922,674 | 11/1975 | Gingras, Jr. et al. | 343/6.8 R |
| 3,946,393 | 3/1976 | Dunne et al. | 343/6.8 R |
| 3,981,011 | 9/1976 | Bell | 343/6.5 SS X |
| 4,059,831 | 11/1977 | Epstein | 343/6.8 R |
| 4,096,477 | 6/1978 | Espstein et al. | 343/6.5 SS |

*Primary Examiner*—T. H. Tubbesing
*Attorney, Agent, or Firm*—Hill, Van Santen, Steadman, Chiara & Simpson

[57] ABSTRACT

A system for identifying persons and objects includes an information carrier adapted to be secured to an object to be identified, and a read unit coupled to the information carrier by means of electromagnetic waves. The information carrier incorporates a plurality of passive elements interconnected with a receive-transmit antenna system so that an interrogation signal is processed and retransmitted as a unique signature of the information carrier. The passive elements of the information carrier include delay elements, attentuation elements, and filters, interconnected in a plurality of parallel paths to generate the identifying signature.

23 Claims, 10 Drawing Figures

APPARATUS FOR IDENTIFYING OBJECTS AND PERSONS

BACKGROUND

1. Field of the Invention

The present invention relates to apparatus for identifying objects and persons and particularly to systems in which an information carrier is secured to the object to be identified and designates the object uniquely.

2. The Prior Art

General principles of such apparatus are known, and one such system is described in Davis et al Patent No. 3,169,242. Identifying systems of this type have a wide application and have been used extensively in connection with the identification of railway freight cars, containers and the like, and have also been used to identify motor vehicles. However, the information carriers of the prior art are subject to certain limitations, which it is desirable to overcome.

It is desirable to provide an identification system which may be economically and efficiently produced, which does not require its own source of electrical power within the information carrier, and which is adaptable to produce a great variety of different identification signals; i.e., having an extensive information content.

BRIEF DESCRIPTION OF THE INVENTION

It is a principal object of the present invention to provide information carriers which are simple and inexpensive to produce and which have a large information content.

Another object of the present invention is to provide such an information carrier which is small and lightweight, is resistent to temperature changes and mechanical shocks, and has an extremely long life.

A further object is to provide such an information carrier which is passive and which requires no power source.

These objects are achieved in the present invention by employing an information carrier incorporating passive elements which are delay elements having discrete delay times. The delay elements are associated with transducers which convert to electromagnetic signal energy at the operating frequency of an antenna system to the operating form of energy of the delay elements, and back again. The information carrier also incorporates attenuation elements having predetermined attenuation characteristics, and filters for selecting or eliminating predetermined bands of frequencies. The passive elements are connected in a plurality of individual branch circuits and are associated with matching networks and an antenna system, all of which are supported on a single common carrier substrate.

These and other objects and advantages of the present invention will become manifest by an examination of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
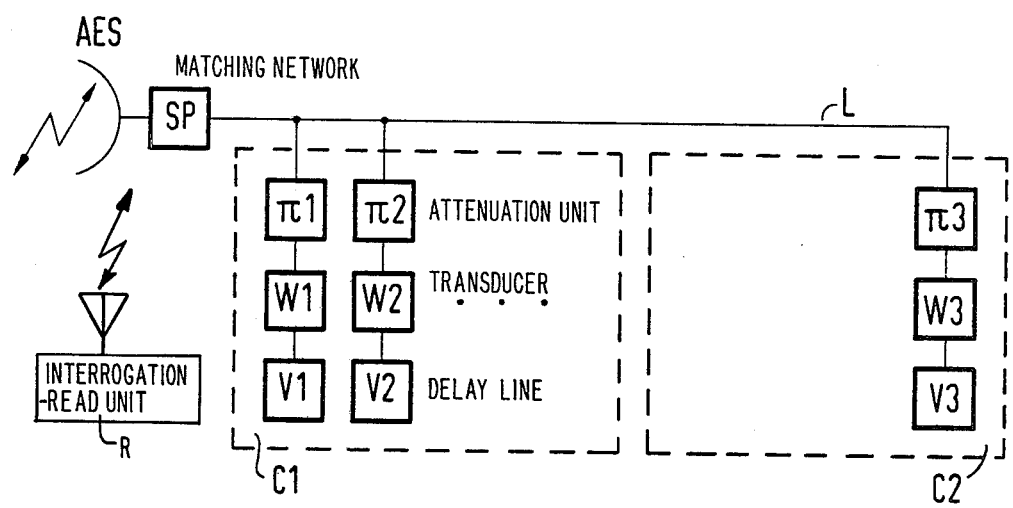
FIG. 1 is a functional block diagram of an identification system according to the present invention in which the identification units incorporate a plurality of delay branch circuits having their inputs connected in common.

Referring now to FIG. 1, the information carrier of one embodiment of the present invention is illustrated. The information carrier of FIG. 1 incorporates two chips C1 and C2, each of which has a plurality of branch circuits with inputs connected in common to a line L. The line L is connected through a matching network SP to an antenna system AES which functions both as a receiving and transmitting antenna.

An electromagnetic interrogation signal is received by the antenna AES from a read device R and this signal is made available on the line L. The matching network SP is designed to allow the maximum energy to reach the line L from the antenna system AES and to transport it with reflection looses as low as possible into the parallel branches. Such passive matching networks are well-known in the art and need not be described specifically herein.

Each of the chips C1 and C2 incorporates a plurality of delay branches, two of such branches being shown for the chip C1. One branch incorporates an attenuation element $\pi 1$, a transducer W1, and a delay line V1. A second branch of the chip C1 incorporates an attenuation element $\pi 2$, a transducer W2, and a delay line V2. Similar delay branches are incorporated in the chip C2, one such branch incorporating an attenuation element $\pi 3$, a transducer W3, and a delay line V3.

The attenuation elements each have a unique attenuation characteristic, which may be the same or different for the individual delay branches. The function of the transducers W1, W2, etc. is to convert the energy made available from the transducer to the form of energy required by the delay lines V1, V2, etc. When the delay element is an acoustic type, the transducer W converts electrical energy from the attenuator to mechanical wave energy, and also converts the mechanical energy back to wave energy, functioning bidirectionally as a similar example a microphone or loudspeaker does. When delay elements other than acoustic delay lines are employed, the transducer W is adapted to bidirectionally convert between the operating energy or frequency of the attenuator and the energy or frequency of operation of the delay element.

The construction and operation of suitable delay elements are known in the art and some are described, for example, in Oliver, *Acoustic Surface Waves* (Springer Press) and in Matthews, *Surface Wave Filters* (John Wiley & Sons Press).

The delay elements are arranged to provide maximum reflection at their remote ends, i.e., they are terminated with a high reflection factor, so that the reflected signal is reconverted by the transducer W, and then the signal is passed through the attenuation unit and the matching network SP to the antenna AES. The operation of the attenuation units, and of the matching network, is bilateral, so that they are equally effective in coupling energy flowing in both directions. As a result of the operation of each delay branch circuit, the interrogation signal is processed by being attenuated, delayed, and retransmitted. The signals processed by all of the individual delay branches are summed on the line L, passed through the matching network SP and retransmitted by the antenna system AES. The read device receives the retransmitted signal, and makes identification of the information carrier by recognizing the unique signature of the output signal. Each individual information carrier has a unique combination of delay branches, so that the signal which is retransmitted is unique to a particular information carrier. Various means of analyzing the signature signal are known. See for example, Kamata et al U.S. Pat. No. 4,069,472.

Since all of the elements of FIG. 1 are passive, no separate power supply is required. A plurality of different chips such as C1 and C2 may be manufactured with common characteristics, and then unique combinations of such chips interconnected with a line L to make up a unique information carrier.

The delay elements, V1, V2, etc. may be either acoustic delay lines for surface waves or bulk waves, formed of crystal material such as quartz, or a lithium-niobat-thallium vanadium sulfide ($TL_3VS_4$) compound substrates with $SiO_2$ layers on lithium tantalat ($LiTaO_3$), Fresnoit ($ALPO_4$) or lithium tantalat may be optical delay lines, such as light conducting fibers of different lengths. Alternatively, the delay lines may be digital in nature such as magnetic bubble delay line, or delay lines formed of charge coupled devices, or TEM-wave delay lines or concentrated element delay lines made from series sections of series inductors and parallel capacitors.

When the delay elements are light conducting fibers, and the energy coupling between the read device and the antenna system AES is in or near the visible spectrum, the transducers W are not required. The antenna system AES is then optical in nature.

The transducers W1, W2, etc. have the function of converting the energy from one form to another, when the form of energy required for operation of the delay elements V1, V2, etc. is not the same as that of the interrogation signal. When the transmitted frequency or form of energy is similar to that required for the delay elements, the transducers may be dispensed with, and the attenuation devices may be connected directly to the delay elements. The interrogation signal of the apparatus of FIG. 1 is an electromagnetic signal which may have a frequency in the range of low-frequency RF up through very high frequencies, beyond the visible spectrum. Preferably, the frequency is between 100 MHz, and 26 Hz.

The signature of the information carrier is made unique by making individual transit or delay times for the individual delay branches, employing different transducers and delay elements for different branches, employing transducers which have different operating band widths, and employing different attenuation characteristics for the attenuation elements.

The interrogation signal may be either a short pulse, with examination of the retransmitted signal after the interrogation pulse terminates, or alternatively, the interrogation signal may be a relatively long pulse, with analysis of the phase and waveshape of the retransmitted signal in relation to the phase of the interrogation signal.

Figure 2:
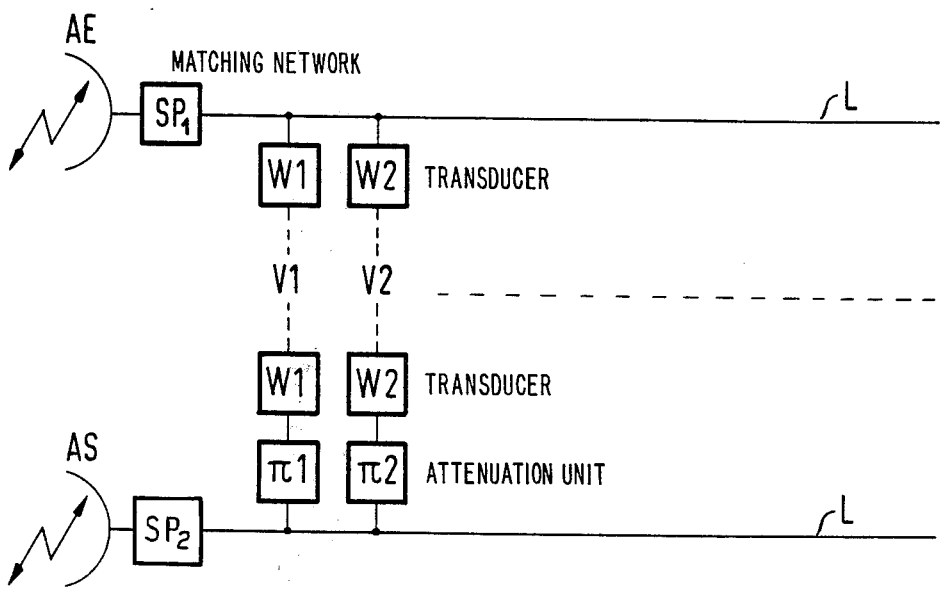
FIG. 2 is a functional block diagram of another embodiment of the present invention in which an information carrier has a plurality of delay branch circuits having their inputs and outputs connected in common.

FIG. 2 illustrates a different embodiment, in which separate antenna systems AE and AS are employed for reception and transmission. In the apparatus of FIG. 2, two branches are shown, identified with subscripts 1 and 2. Each of the delay lines V has a pair of transducers W, one at each end of the delay line. An attenuation unit $\pi$ is connected in series with the delay line and transducers. Matching networks SP1 and SP2 produce conjugate complex matching between the antenna impedances of the branches connected in parallel.

An interrogation signal received by for example the antenna system AE is passed through a matching network $SP_1$ to a common input of all of the delay branches, and each of the delay branches produces an output which is connected in common to a second antenna system AS. The antenna systems AE and AS may have different frequencies of operation, so that the retransmitted signal may be at a different frequency from the interrogation signal.

Figure 3:
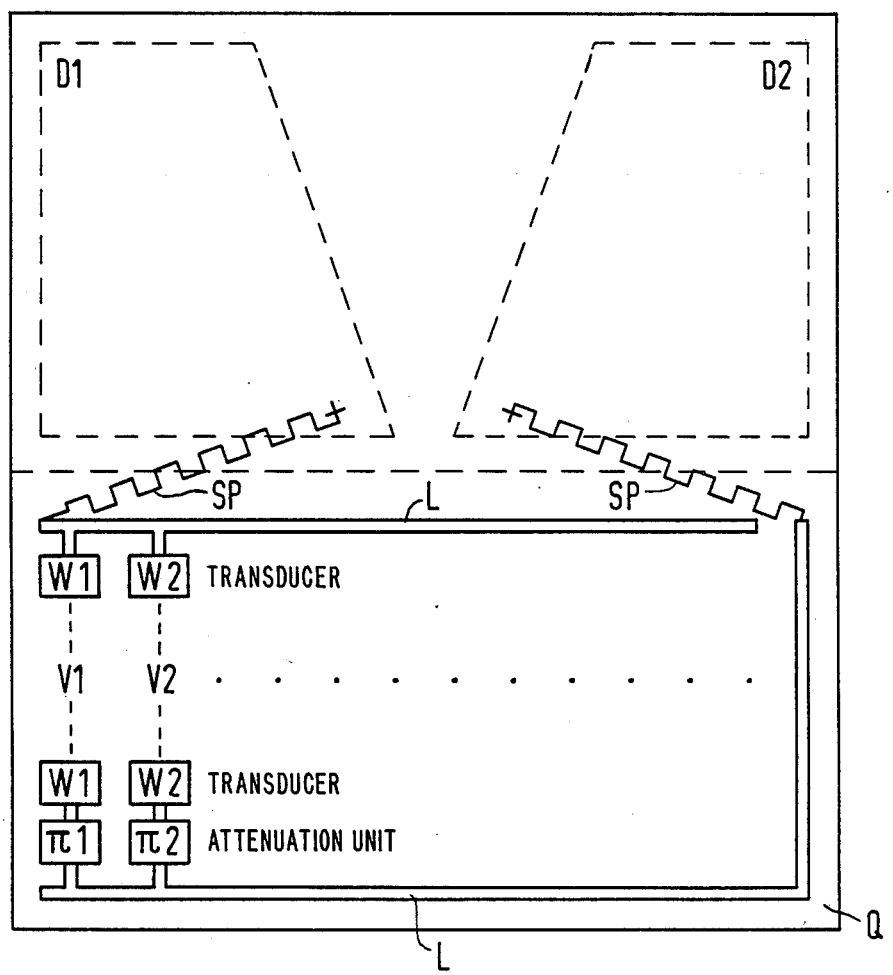
FIG. 3 is a functional block diagram of an information carrier constructed in accordance with the embodiment of FIG. 2.

Although only a few parallel branch circuits are shown in the embodiments of FIGS. 1-3, it will be apparent that many more such circuits can be incorporated, if desired, to increase the complexity of the signature signal.

FIG. 3 illustrates a physical embodiment of the apparatus illustrated in FIG. 2. All of the elements are supported on a single carrier Q which is preferably a disk formed of quartz, or lithium-niobat. On one side of the disk Q, a series of delay branch circuits is provided, incorporating the delay lines V1, V2, etc. All of the branches have their inputs and outputs connected in common to two separate lines L, which may be printed circuit lines, and the lines L are connected to matching coils SP which are also provided on the same side of the disk Q. The free ends of the coils are connected to antenna dipoles D1 and D2 which are secured to the opposite side of the disk Q.

The disk Q may be installed in a shock-proof, hermetically sealed housing, and may be encapsulated in plastic or the like. The antenna can also be constructed in such a manner that the dipoles D1 and D2 form part of a carrier substrate for the delay lines, the transducers, and the attenuation elements.

Figure 10:
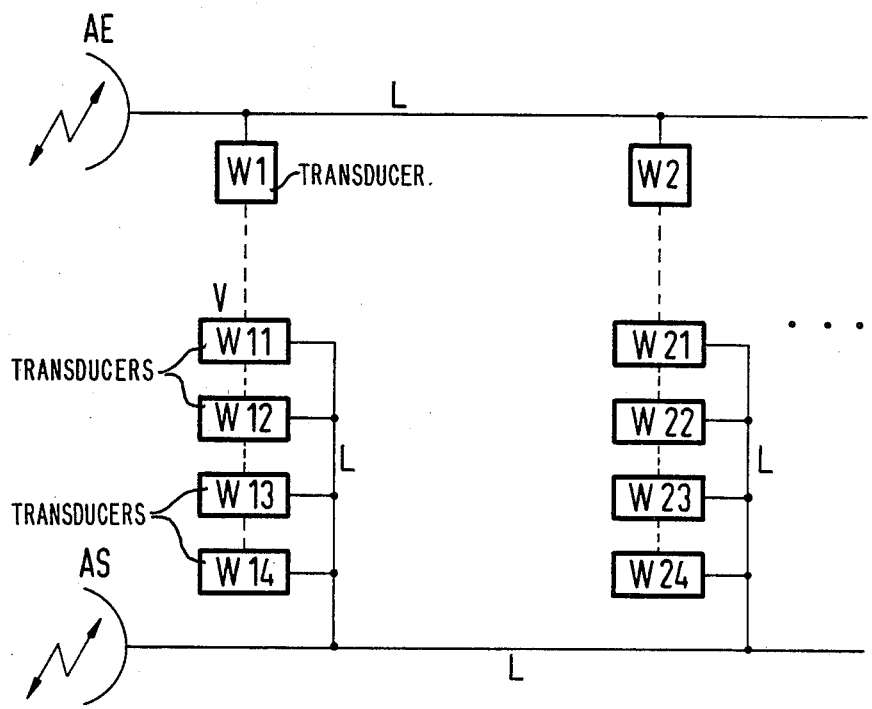
FIG. 10 is a functional block diagram of yet another embodiment of the present invention.

When the quartz disk Q has a useful area of about 40 mm by 40 mm, approximately 40 different delay branch circuits analog to FIGS. 1 and 2 and move than 130 analog to FIG. 10 may be provided, each with a delay time up to a maximum in this case of about 3 microseconds. It is apparent that by varying the combinations of attenuation characteristics delay times transductor frequency characteristics and absolute phase delay of each branch circuit, a very great information content can be stored by the information carrier.

The apparatus of FIG. 3 can be economically constructed by mass-producing information carriers with sixty or more different delay line branch circuits, and then selectively disabling some of the branches by severing their connections with, for example, a laser beam. In the same manner, a plurality of delay elements may be connected in series, and a given delay time selected by interrupting short circuits around some of the elements, whereby the delay time is the sum of the times of the element with interrupted short circuits. In the same manner, attenuation elements can be selectively connected by selectively interrupting short circuits around such attenuation elements. This process can take place automatically, with the position of the laser beam computer controlled in accordance with stored information. The stored information can be related to the position of a single branch circuit which is placed with precision, so that automatic operation is feasible.

In the case of surface accoustic delay lines on substrate like quartz and others the transducers W (Matthews, chapt. 2 for example) and attenuators $\pi$ are evaporated metallic layers on the substrate which may be interdigitally shaped for example via photolithographic methods. Interconnection to the lines L of FIGS. 1, 2, 3 and 10 may be done with bonding wires as they are well known from semiconductor technologies. Coding of such apparatus could be done in this case by only bonding and interconnecting selected branches to the lines L with a boundary machine steerable through a computer.

After the disks have been individually coded in this way, they may be cemented into a hermetically sealed housing. In the alternative, when existing electronically steerable photolithographic or electronic beam exposing machines are employed to manufacture the delay branches, individual information carriers may be manufactured from computer stored individual masks, providing predetermined characteristics for the attenuation and the delay times, as well as the frequency of operation of the apparatus. With the aid of electron beam exposure during processing, extremely high resolution can be obtained, and information carriers may be manufactured which are responsive to very high frequencies such as 2 to 3 GHz.

Figure 4:
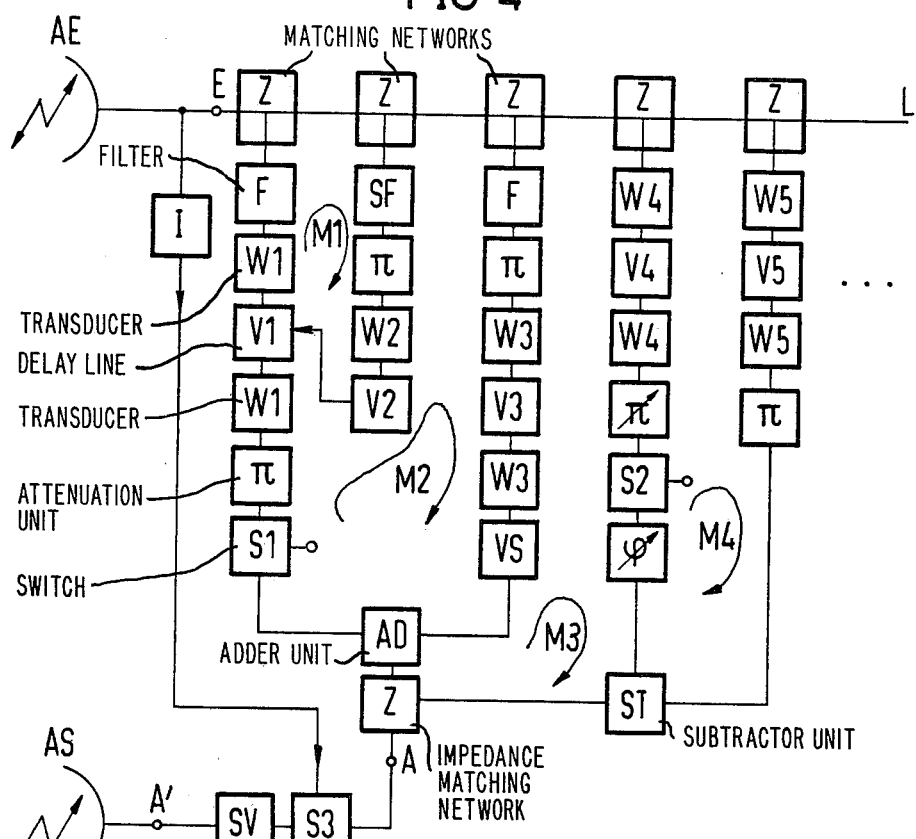
FIG. 4 is a functional block diagram of a further embodiment of the present invention.

Another embodiment of the present invention is illustrated in FIG. 4. The embodiment of FIG. 4 incorporates active amplifiers, and therefore requires an independent power source, which may be for example, a small battery designed to last a long time. If a rechargeable battery is used, facilities may be provided for recharging the battery each time the information carrier is interrogated, or a solar cell may be employed for recharging. By the use of amplifiers, the transmitted signature of the information carrier is made stronger, so that the range of the identification process is increased.

The receiving antenna is connected from its terminal E to a plurality of delay branch circuits, through a common line L connected to the inputs of a plurality of matching networks Z. A first branch incorporates a filter F for filtering the interrogation signal and passing it to a transducer W1, which supplies a signal to a delay line V1. The delayed signal is converted by another transducer W1 at the output of the delay line V1, and the signal is attenuated by an attenuation unit $\pi$, and passed to the input of a switch S1.

A second branch incorporates a band elimination filter SF. Its output is connected through an attenuator $\pi$, a transducer W2 and a delay line V2. The output of the delay line V2 is connected as an input to a tap of the delay line V1, so that signals processed by the two branches are mixed together in the delay line V1.

A third branch incorporates the filter F, an attenuation unit $\pi$, a delay line V3 with a transducer W3 at each end, and an amplifier VS. The switch S1 and the amplifier VS both furnish signals which are connected as inputs to an adder unit AD, the output of which is connected to an impedance matching network Z.

A fourth branch incorporates a delay line V4 with a transducer W4 at each end, an adjustable attenuator, a switch S2, and a phase shifting circuit, the output of which is connected to a subtraction unit ST. A fifth branch incorporates a delay line W5 and an attenuation unit $\pi$ which furnishes a second input to the subtractor unit ST. The output of the subtractor circuit is connected to another input of the matching network Z, the output of which (at output terminal A) is connected through a switch S3 and a transmitting amplifier SV to a terminal A′, connected with the transmitting antenna system AS. The switches S1 and S2 may be open or closed, and they can be stored electronically or mechanically no that the information content of the apparatus would be steerable by the user for special applications. The five parallel branches form four meshes M1-M4, as illustrated.

It is apparent that by establishing a unique permutation of parameters for the various filters, delay times, attenuations, switches and the phase shift of the phase shifter, a very large information content can be represented by the apparatus of FIG. 4.

The switch S3 is operated in response to a signal derived from an identification unit I, which is connected directly to the input terminal E of the identification system. The identification unit I is arranged to respond only to a predetermined type of interrogation signal received at the receiving antenna AE, so that only when such an interrogation signal is received, is the apparatus of FIG. 4 enabled to transmit its signature. This makes it possible to enlarge substantially the number of information carriers in a system, since only the information carriers which can respond to the given interrogation signal will transmit their signatures. The identical signatures of different information carriers, therefore cannot be confused as long as they are associated with identification units I which respond to different interrogation signals.

The identification unit I is preferably a simple receiver which receives and demodulates the identification signal, which may be modulated in amplitude, frequency, or phase. The demodulated signal is then compared with predetermined data stored within the identification unit I, and if comparison is achieved, the switch S3 is operated. The information storage may be digital in nature, when a particular digital code is transmitted as the interrogation signal. Alternatively, it may be a particular modulating frequency, and in that case the stored information may be determined by the frequency response of a tuned circuit or the like.

With complicated circuits such as that illustrated in FIG. 4, the signatures produced by the individual information carriers are different to imitate, so that the reliability of the identification is assured. The signature may be analyzed by the frequency components of the transmitted signature, and the amplitude band width and phase characteristics thereof.

Figure 5:
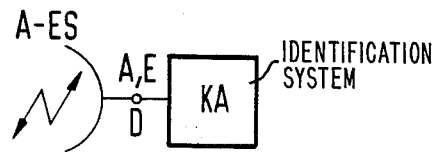
FIGS. 5-8 are functional block diagrams of the manner in which the information carrier may be connected with the antenna systems.
Figure 6:
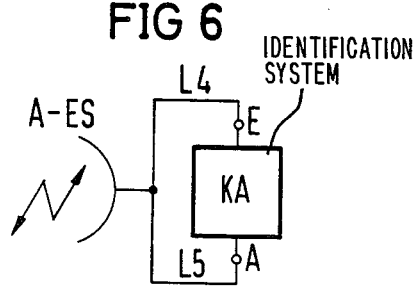
Figure 7:
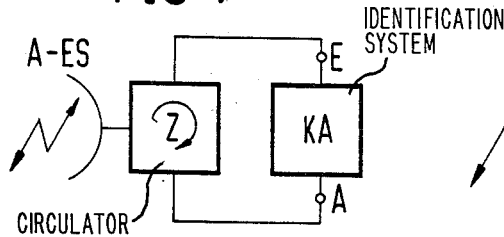
Figure 8:
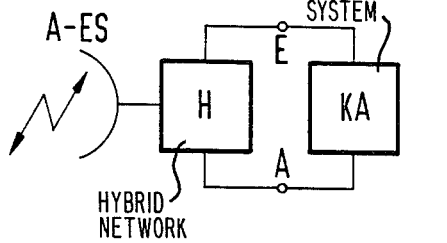

The input E and the output A (or A′) of the apparatus of FIG. 4 may be connected with one or two antennas. When two antennas are employed, they may be cross polarized dipoles, to minimize cross coupling between the two antennas. When a single antenna is used, it may be connected as a direct parallel connection, as shown in FIG. 5, where the input E and the output A are connected in common with terminal D. Alternatively, the input and output terminals may be connected by separate lines L4 and L5 to the antenna system, as shown in FIG. 6. A circulator Z may be interposed between the antenna system and the terminals A and E, as shown in FIG. 7, or a hybrid network H may be interposed between the terminals A and E and the antenna system, as shown in FIG. 8. The individual elements of the system, and the antennas, may be applied to the same substrate in the manner illustrated in FIG. 3, or may be supported on separate substrates.

Figure 9:
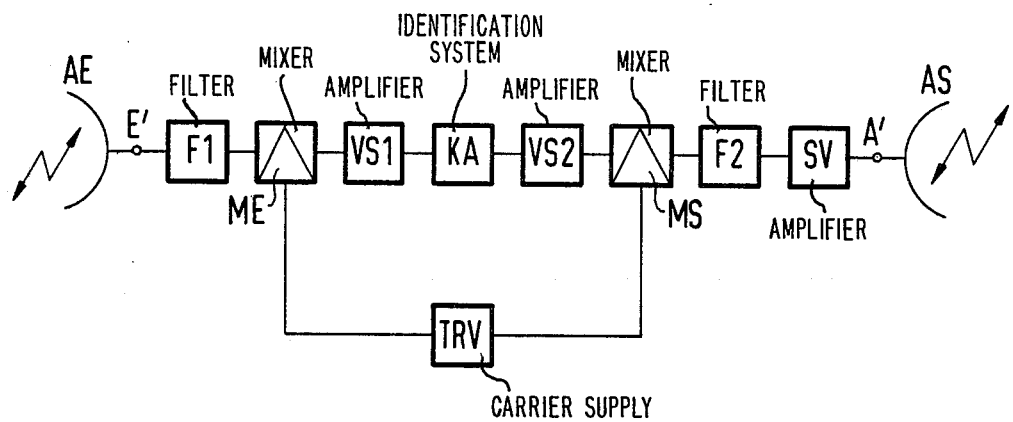
FIG. 9 is a functional block diagram of a further embodiment of the present invention.

FIG. 9 illustrates a circuit which may be used when the interrogation signal and the signature signal are transmitted in frequency ranges for which delay networks are not feasible. A filter F1 receives the interrogation signal, and supplies it to a mixer ME, which produces high and low side bands, effectively shifting the frequency of the signal. The output of the mixer is amplified by an amplifier VS1, and applied to the input of an identification system KA, which is constructed in accordance with one of the embodiments heretofore described. It operates in a frequency range corresponding to one of the side bands formed by the mixer unit ME, and the other side band is ignored. Another amplifier VS2 amplifies the signature output of the identification unit, and applies it to a second mixer MS. A filter F2 selects a side band output of the filter MS and supplies it to the transmitting antenna through a transmitting amplifier SV. A carrier supply TRV supplies signals at the same frequency to the two mixers, so that the transmitting antenna AS receives a signal at the same frequency as that received by the receiving antenna AE. The apparatus of FIG. 9 is usable at frequencies from low frequencies up to several hundred GHz.

If desired, known techniques of high frequency pulse compression and/or pulse expansion may be applied to the delayed signature signal. When pulse expansion is employed, a portion of the signature may be recognized by the duration of a pulse transmitted by the information carrier in response to a short interrogation pulse. When pulse compression is employed, the signature signal may be one or more pulses which are shorter than the interrogation pulse, in which case, there may be passive amplification which enhances the signal-to-noise ratio of the read system. Pulse compression and expansion techniques are described in the aforementioned treatises by Oliver and Mattheus.

FIG. 10 illustrates another embodiment of the present invention which results in an information carrier having a particularly high information density, within a very small space. In the arrangement of FIG. 10, a transducer W1 drives a delay line V, and a plurality of transducers W11, W12, etc. are arranged along the path of the surface wave or bulk wave of the delay line. Their outputs are connected in common to the output antenna AS. A similar arrangement is employed for the second branch, which embodies a first transducer W2. As many transducers are provided as there are delay times required. The transducers are each chosen to respond maximally to the frequency of the wave within the delay line, so that the maximum amount of energy is produced at the output of each converter, so that relatively little of the energy received by the receiving antenna AE is lost.

It will be appreciated that the present invention provides an indentification system incorporating information carriers which can be manufactured in simple fashion with small size and low weight. The information carriers of the present invention are not temperature sensitive, and have high resistance to environmental conditions such as humidity, vibration and shock. In addition, a high reading reliability and insurance against false signals is provided, and operation is possible over an extremely wide frequency range.

It is apparent that various additions and modifications may be made in the present invention without departing from the essential features of novelty thereof, which are intended to be defined and secured by the appended claims.

I claim:

1. In an identification system having an information carrier secured to an object to be identified and a read unit connected with the latter via electromagnetic waves, the information carrier comprising an antenna system, a plurality of passive elements connected in a plurality of branch circuits, at least the inputs of said branch circuits being connected in common, and matching circuit, connected between said common connection and said antenna system, said passive elements comprising delay elements having different defined delay times, transducers connected with said delay elements with defined frequencies and bandwith for driving said delay elements, and attenuation elements having defined attenuation characteristics, and a common carrier member for carrying said passive elements.

2. The information carrier according to claim 1, wherein said delay elements and transducers consist of electromechanical devices, and are constructed as surface wave or bulk wave delay lines on substrate materials with electro-accoustical coupling characteristics, said attenuation elements also being carried by said carrier member.

3. The information carrier according to claim 2, wherein said substrate material is selected from the group comprising quartz, lithium-niobate, thallium-vanadium-sulfide ($Tl_3VS_4$).

4. The information carrier according to claim 2, wherein said substrate comprises an $SiO_2$ layer on a composition selected from the group consisting of lithium-tantalate ($LiTaO_3$), Fresnoit ($AlPO_4$) and lithium-tantalate.

5. The information carrier according to claim 1, wherein said delay elements consist of parallelly connected light conducting fibers, and said antenna system is an optical device.

6. The information carrier according to claim 1, wherein said delay elements consist of distributed electromagnetic delay lines.

7. The information carrier according to claim 1, wherein said delay elements consist of a plurality of individual delay elements connected in series and consisting of concentrated series inductors and parallel capacitors being the concentrated equivalent to electomagnetic distributed delay lines.

8. The information carrier according to claim 1, wherein said delay elements are formed of materials having a ceramic or metal base.

9. The information carrier according to claim 1, wherein said delay elements consist of charge coupled devices.

10. The information carrier according to claim 1, wherein said delay elements are constructed of magnetic delay line elements.

11. The information carrier according to claim 1, including an active amplifier connected in one of said branch circuits or in the common line of all of the paralleled branch circuits.

12. The information carrier according to claim 1, wherein said branch circuits are constructed for pulse compression or pulse expansion.

13. The information carrier according to claim 1, wherein said information carrier comprises elements formed on said carrier member by means of computer control by electron beam exposure or photolithographic exposure.

14. The information carrier according to claim 1, including inchanicaly or electronically cevable switches in some or all of the parallel branches.

15. The information carrier according to claim 1, wherein one or more of said branches have interruptable conductors, whereby individual branch circuits are separable and said attenuation elements are adjustable in their value.

16. The information carrier according to claim 1, wherein each of said delay elements comprises a first transducer for producing a surface wave, and a plurality of additional transducers on the path of said surface wave for producing a plurality of different delay times.

17. The information carrier according to claim 1, wherein said delay elements, transducers, attenuation elements, matching circuits, and antenna system are carried on a single substrate.

18. The information carrier according to claim 1, wherein said antenna system and said matching circuit are carried on a substrate arranged in a hermetically sealed housing.

19. The information carrier according to claim 1, including a receiving mixer connected to the common input of said branch circuits and a signal converter connected to the outputs of said branch circuits for converting back the signal produced thereby to the same frequency as the originally received signal, and a transmitting amplifier connected to the output of said signal converter.

20. The information carrier according to claim 19, wherein said mixer and said converter are connected to a common carrier supply.

21. The information carrier according to claim 1, wherein the delay elements of the individual branch circuits are terminated at their outputs with a high reflection factor.

22. The information carrier according to claim 1, including filters series connected in said individual branch circuits.

23. In an identification system having an information carrier secured to an object to be identified and a read unit for interrogating said information carrier by means of an electromagnetic interrogation signal, an information carrier comprising receiver means for receiving said interrogation signal, a plurality of branch circuits connected to said receiver means for processing said interrogation signal, each of said branch circuits having delay means for introducing a different predetermined delay and at least one of said branch circuits having attenuation means for attenuating said interrogation signal, and transmitting means for combining signals processed in all of said branch circuits and for transmitting said combined signals as an electromagnetic composite signal.

* * * * *